Aug. 18, 1931.  A. SEPPOLA  1,819,924

TRACTION DEVICE FOR VEHICLES

Filed June 18, 1929

WITNESSES

INVENTOR,
Aste Seppola.
BY

ATTORNEYS.

Patented Aug. 18, 1931

1,819,924

UNITED STATES PATENT OFFICE

ASLE SEPPOLA, OF ENTWISTLE, ALBERTA, CANADA

TRACTION DEVICE FOR VEHICLES

Application filed June 18, 1929. Serial No. 371,834.

This invention relates to a traction device designed and adapted to be used on power-driven vehicles such as automobiles and trucks, and power-driven agricultural machines and closely analogous machines.

The principal object of the invention is to equip a vehicle or machine of the indicated character with traction devices of an improved form, whereby the driving efficiency thereof will be increased, and whereby the vehicle or machine will have increased clearance so as to straddle large objects or obstructions on the ground.

Figure 1:
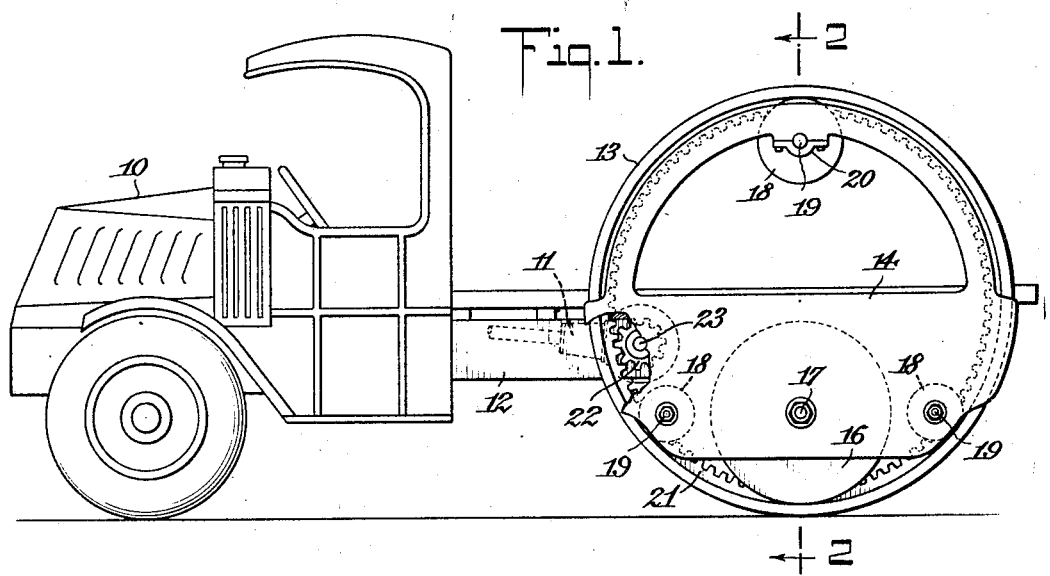
Figure 2:
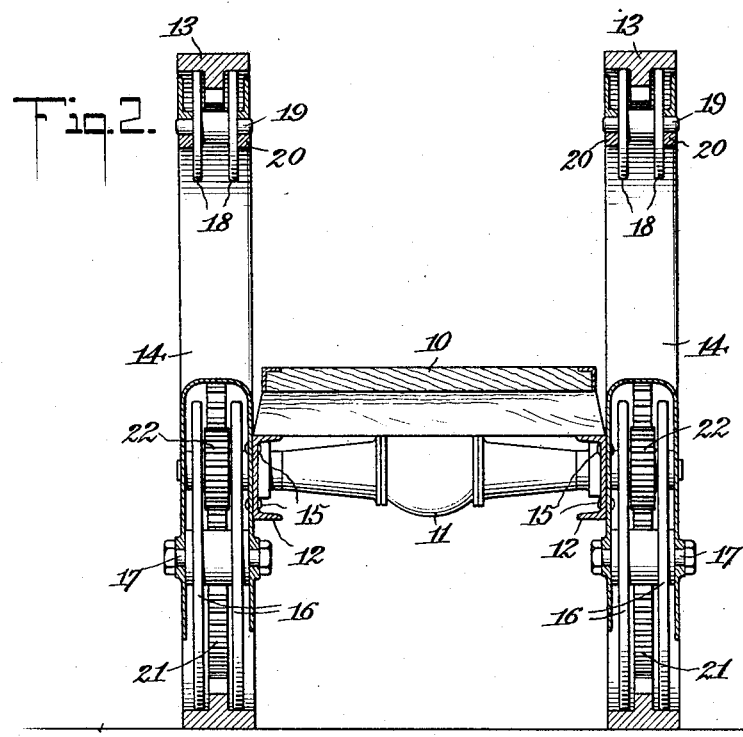

With the foregoing and other objects in view, the invention resides in the particular provision, construction and functions of the parts hereinafter fully described and illustrated in the accompanying drawings, in which Figure 1 is a side view of a motor truck selected to illustrate the present invention;

Figure 2 is a transverse sectional view taken on the line 2—2 of Figure 1.

Referring more particularly to the drawings, it will be apparent that there is shown a truck 10, which is conventionally illustrated, and it will essentially include a power plant and driving mechanism including a differential drive 11 supported in any practical manner in the plane of the running gear frame or chassis 12. Traction devices are associated with the chassis 12 at opposite sides thereof to impart forward and rearward translatory movement to the truck.

Each of the traction devices includes a spokeless traction wheel or rim 13 which may be provided with any practical form of tread surface such as a resilient tire, or may also be provided with spikes or the like. The rim 13 is mounted for rotation by the use of a stator in the form of a guard frame 14 of such shape and size as to fit within the rim 13, and coacting means on the rim and frame 14 presently to be described. The frame 14 is rigidly secured in any preferred manner to the rail or side member of the chassis 12, the fastening being designated at 15. One or two load sustaining wheeels 16, there being two in the present instance, are mounted in the frame 14 by the use of a short axle 17. The axle 17 is disposed in a plane extending vertically through the axis of the rim 13. The wheels 16 roll in contact with the inside of the rim 13 and support the weight of the rear end of the truck, together with any load arranged thereon. In order to stabilize or steady the rim 13 there are provided stabilizing rollers 18, which are preferably but not necessarily arranged in pairs, each pair being supported for rotation by a short axle 19 supported in suitable bearings 20 on the frame 14. In order to impart rotary movement to the rim 13, said rim is provided with an internal gear 21, and meshing with said gear 21 is a driving pinion 22 fixed on one of the shaft parts 23 of the differential drive 11.

From the foregoing it will be apparent that rotation of the pinions 22 will cause rotation of the rims 13, which by reason of the fact that they are of comparatively large diameter increase the bearing surface thereof on the ground, thereby increasing the driving efficiency of the truck; and that no shaft or axle extends from one side to the other below the chassis, consequently there will be much more space or clearance between the chassis and ground, to the end that large objects and obstructions on the ground may be straddled as the truck traverses the ground.

It is to be understood that each rim 13 may be driven in the manner illustrated and described, or it may also be driven by a friction wheel rotatably in contact with the inside of the rim places level with or above the chassis 12. It is also to be understood that the driving gear or friction wheel may be coupled with the engine of the vehicle in any other manner than the one shown, and that the rims may be of any preferred diameters. It is also to be understood that any other arrangement of stabilizing or steadying rollers than that shown may be adapted to properly support each rim 13.

What is claimed is:

1. A traction device of the class described having the combination of a stator frame having relatively spaced side members, a traction rim, axles, the opposite ends of each axle being supported by bearings respectively on said side members, and load sustaining wheels on one of said axles in rolling contact with the inside of said rim, each of the remaining axles having rollers thereon in rolling contact with the inside of said rim, and an annular member on the inside of said rim interposing the wheels on the one axle and the rollers on each of the remaining axles.

2. The combination with a vehicle running gear frame, of a stator arranged on each side of said frame, a traction wheel mounted for rotation on said stator, a load sustaining wheel, said load sustaining wheel being mounted on an axle carried solely by said stator and in rolling contact with said traction wheel, and means to drive said traction wheel, said means including an internal gear on said traction wheel, and a driver which coacts with said gear, said driver being disposed not lower than the plane of said frame.

3. The combination with a vehicle chassis, of a stator arranged on each side of said chassis, a traction rim surrounding each stator, independent axles on said stator, a load sustaining wheel mounted on one of said axles and in rolling contact with said rim, rollers mounted on the remaining axles and in rolling contact with the rim to co-operate with said wheel to mount the rim for rotation, and means including differential gearing to drive said rim.

ASLE SEPPOLA.